United States Patent [19]

Swank

[11] Patent Number: 4,981,744

[45] Date of Patent: Jan. 1, 1991

[54] NON-PLANAR EXPANDABLE HONEYCOMB STRUCTURE

[76] Inventor: Michael W. Swank, 3707 Corliss Ave., N., Seattle, Wash. 98103

[21] Appl. No.: 513,761

[22] Filed: Apr. 24, 1990

[51] Int. Cl.$^5$ .............................................. B32B 3/12
[52] U.S. Cl. ..................................... 428/116; 52/806; 156/197
[58] Field of Search ................. 428/116, 73, 117, 118; 156/197; 52/806

[56] References Cited

U.S. PATENT DOCUMENTS

| | | | |
|---|---|---|---|
| 2,428,979 | 10/1947 | May | 156/197 |
| 2,527,752 | 10/1950 | May | 156/197 X |
| 2,549,802 | 4/1951 | George et al. | 156/197 X |
| 2,644,777 | 7/1953 | Havens | 428/116 |
| 3,006,798 | 10/1961 | Holland | 428/116 X |
| 3,432,859 | 3/1969 | Jordan et al. | 428/116 X |
| 4,411,381 | 10/1983 | Ittner et al. | 428/116 X |
| 4,457,963 | 7/1984 | Ittner et al. | 428/116 X |

Primary Examiner—Henry F. Epstein

[57] ABSTRACT

An expandable honeycomb product which is formed by printing an adhesive pattern onto a plurality of webs of a suitable core material. The unit of adhesive pattern is a truncated triangle which is repeated at intervals along webs of core material, which are stacked such that the adhesive pattern is staggered relative to each web. When expanded, the webs deform into a honeycomb product composed of a repeating pattern of six-sided cells. Each cell may have a different inner and outer height and width, due to the introduction of differential inner and outer waveform wavelength and amplitude by adhesive pattern, allowing the production of non-planar honeycomb product which may be deformed into a structure having small radius curvatures about either axis or both axes along the surface of the honeycomb structure.

4 Claims, 5 Drawing Sheets

NON-PLANAR EXPANDABLE HONEYCOMB STRUCTURE

BACKGROUND—FIELD OF INVENTION

This invention relates generally to honeycomb structures and more particularly to a method of producing non-planar honeycomb structures and resulting honeycomb product.

BACKGROUND—DISCUSSION OF PRIOR ART

Conventional honeycomb structures are usually formed by one of two methods. In the first method, or "corrugation method", a ribbon of core material is corrugated such that the opposite longitudinal edges define truncated triangular wave forms when viewed from the side. The first structure of each ribbon is composed of a rising section, an upper horizontal section, a falling section, and a lower horizontal section. This unit structure may be repeated indefinitely along the ribbon of core material. Successive ribbons are placed one on top of the other such that a repeating pattern of hexagonal cells are formed. The lower horizontal sections of the unit structures of one ribbon engage the upper horizontal sections of the unit structures of the underlying apposed ribbon. The portions which are engaged are termed "nodes" and are brazed or glued together. An indefinite number of corrugated ribbons may be joined in this manner to produce a large planar honeycomb sheet.

In the second method of forming honeycomb, or "adhesive method", regularly spaced, uninterrupted parallel lines of adhesive are applied to a number of webs of core material. The webs of core material are stacked atop each other such that the lines of adhesive on consecutive webs are parallel but staggered relative to one another. The resultant stack may be sliced perpendicular to the adhesive lines, and slices may be expanded to form sheets of honeycomb. Portions of apposed sheets of web material which are engaged due to adhesive bonding define the nodes.

Sheets of honeycomb formed by either of the above methods are commonly provided with panels or "skins" on either side of the honeycomb sheet and bonded thereto so that a laminated honeycomb panel results. In other instances, sheets of honeycomb may be curved into a cylindrical shape and a skin applied to the external surface of the honeycomb.

Skinned honeycomb panels are used in the aerospace industry, as well as in the construction of high-performance racing boats and automobiles, because they have both a very high strength-to-weight ratio, and superior resistance to impact normal to the surface of the panel.

Use of honeycomb sheets in the construction of non-planar structures is limited to structures with relatively large radii of curvature, i.e., 2 or more orders of magnitude greater than the thickness of the honeycomb sheet itself. When a sheet of honeycomb is curved into a cylindrical shape, the structure assumes an hourglass shape such that the central portion of the cylinder bows inwardly. This effect is due to the stretching of the external surface, and a compression of the internal surface of the honeycomb sheet. The cylinder may be constrained in a mold or a form such that it assumes a straight cylindrical shape, but this places strains on the individual cells and can result in the failure of the nodes.

It can be seen that there are structures which cannot be constructed of prior art honeycomb sheets. For example, it is impossible to deform planar honeycomb sheets into tubing with a radius only several times the honeycomb sheet thickness. It is also impossible to deform planar honeycomb sheets into structures with small radius curvatures in two dimensions. There are many potential applications for honeycomb in small radius structures, including bicycle tubing, helmets, kayaks, and in a variety of aerospace applications.

U.S. Pat. Nos. 4,457,963 and 4,411,381 both to Ittner et al, describe a method for the construction of straight cylindrical honeycomb structures. In comparison to the present invention, this method has many disadvantages, including:

(a) the method described can only be used in the construction of straight cylinders of circular cross-section;
(b) the method does not allow the construction of structures with curvatures in two dimensions;
(c) the method is restricted to the use of a ribbon of core material which can be corrugated and retain this shape prior to brazing;
(d) the method requires the use of a ribbon of core material which can be joined by brazing, thus precluding the use of many other core materials which are glued together in the adhesive method of construction, e.g., kraft paper, aramid paper, carbon fiber paper, and fiberglass, aramid, and carbon fiber cloths, and other core materials;
(e) the method allows only the construction of straight cylinders with the core material and unit cell in a circumferential orientation and does not allow and axial orientation of core material and unit cell;
(f) the method is severely limited in the ease with which different sizes of cylinder may be constructed, as extensive retooling of the corrugator, rollers, and platform is required for the construction of different sizes of honeycomb, thus leading to the next disadvantage;
(g) compared to the adhesive method, this method is slow and expensive, and consequently;
(h) the method has seen little commercial use.

OBJECTS AND ADVANTAGES

Accordingly, several objects and advantages of the present invention are to provide a form of expandable non-planar honeycomb with the following properties:

(a) may have curvatures in one or two dimensions;
(b) conforms to the desired shape without producing strain and risk of failure at the nodes;
(c) uses the same manufacturing machinery without the extensive retooling for different sizes and shapes of honeycomb product;
(d) uses the relatively inexpensive adhesive method of construction;
(e) can be constructed from a large selection of core materials which are not constrained by the limitations of the corrugation method of construction which requires that the core material retain the desired shape after corrugation;
(f) allows the core material and unit cell to be oriented in either of two orthogonal directions.

Further objects and advantages of the present invention will become apparent from a consideration of the drawings and ensuing description of it.

Figure 1:
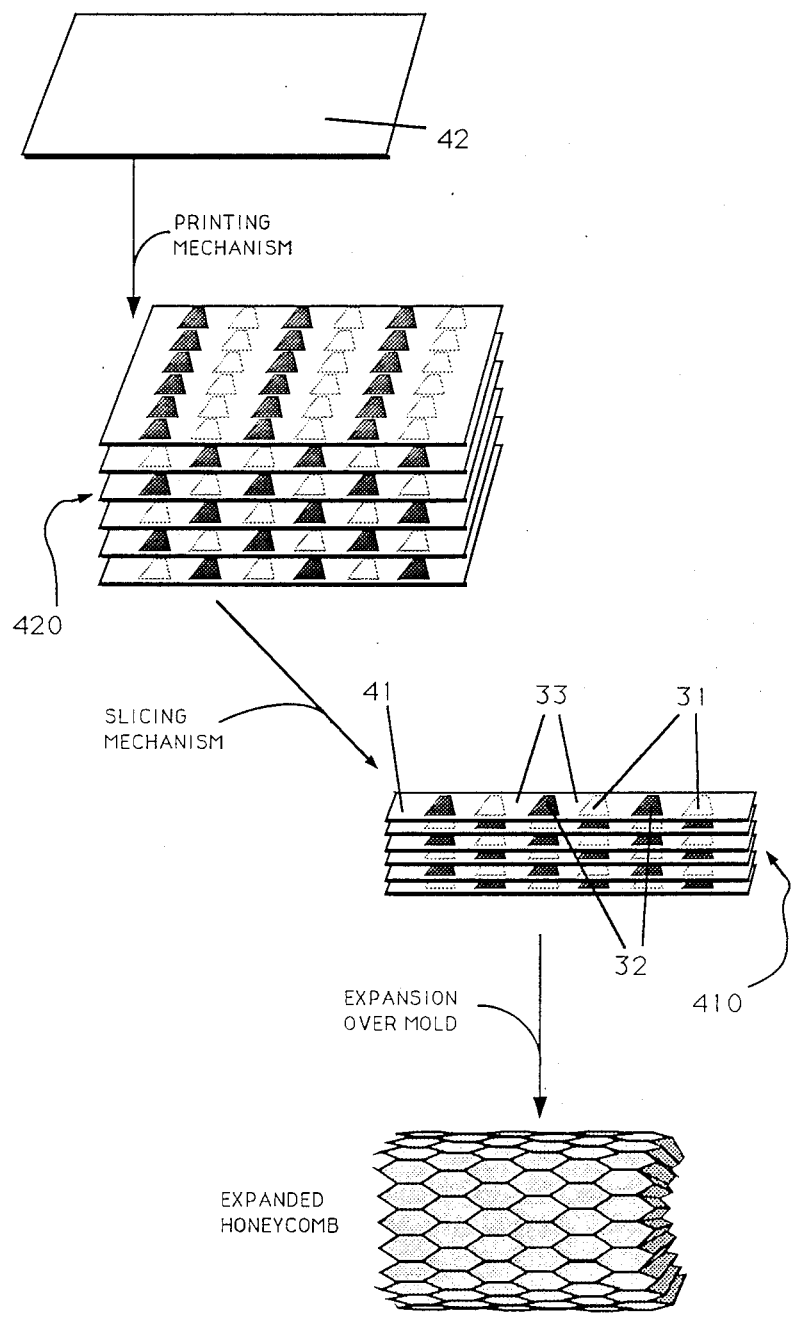
FIG. 1 is a highly diagramatic perspective view of the method of forming a non-planar expandable honeycomb structure in accord with the present invention.

LIST OF REFERENCE NUMERALS 21 inner edge of web 41
22 outer edge of web 41
31 region of web 41 which engages region 32 of underlying web 41
32 region of web 41 adhesive has been applied
33 region of web 41 adjacent to region 32 and which is not glued to overlying or underlying webs 41
web of core material obtained from slicing web 42 after adhesion and stacking of multiple webs 42
42 web of core material
410 stack composed of multiple sheets of web 41 obtained from slicing stack 420
420 stack composed of multiple sheets of web 42

DETAILED DESCRIPTION OF THE INVENTION

FIG. 1 shows a highly schematic method of producing the honeycomb structures of the present invention. A web 42 has adhesive printed on it in a regular array. The preferred method of printing is the commonly used offset printing method, as is use for making planar honeycomb. Alternate methods could be utilized, however, and this invention is not limited to any single method of printing. Direct ink-jet printing, or "laser printing", could be used in the construction of more complex forms of honeycomb which require printing of variable adhesive patterns, as discussed later. Multiple units of web 42 are printed and stacked, forming a stack 420. After adhesive has cured, and unexpanded honeycomb sheet 410 is sliced from stack 420. Honeycomb sheet 410 is composed of multiple layers of web 41. Honeycomb sheet 410 may be impregnated with a suitable resin, for example epoxy. Honeycomb sheet 410 is then expanded over a mold which is of the desired shape, the resin is cured, and the final expanded honeycomb sheet 410 is completed. Alternately, sheet 410 may be impregnated with a slow curing resin and supplied as a pre-preg form, to be expanded and cured by the user. The expanded sheet, if it is to be a closed cylinder, can be seamed at the region at which the edges of the honeycomb sheet meet by any of variety of methods, including adhesive bonding, or the edges of the honeycomb sheet may be left in an unjoined fashion, and simply placed in apposition. Skins may then be bonded to the outer and inner surfaces of honeycomb sheet 410.

Figure 2A:
FIGS. 2A, 2B, and 2C are a perspective view of several non-planar honeycomb structures which can be produced in accord with the present invention.
Figure 2B:
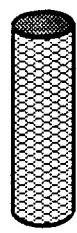
Figure 2C:
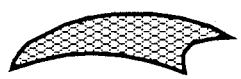

FIG. 2 shows several examples of non-planar honeycomb structures which can be produces in accord with the present invention. All structures shown are constructed of multiple layers of a web 41, which when glued together and expanded in accord with the present invention, form non-planar honeycomb structures, of which only a few possible configurations are shown here. FIG. 2A shows a straight cylinder with multiple units of web 41 oriented parallel to the long axis of the cylinder. FIG. 2B shows a straight cylinder with multiple units of web 41 oriented circumferentially about the long axis of the cylinder. In the examples shown in FIG. 2A and 2B, there is curvature in one direction only, i.e., about the long axis. FIG. 2C shows a non-planar honeycomb structure with curvature in two directions, parallel to the sheet and at right angles to each other.

Figure 3:
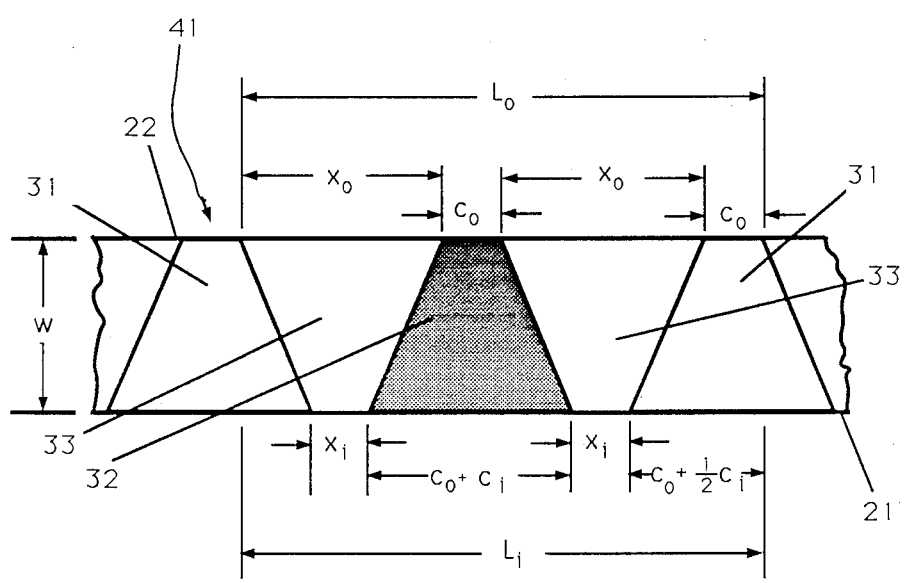
FIG. 3 is a fragmentary top plan view of a web of core material after adhesive has been applied.

FIG. 3 shows a fragmentary top plan view of web 41 after adhesive has been applied. Adhesive is applied to web 42, and after stacking multiple sheets of web 42, individual sheets 410 of honeycomb are sliced from stack 4250 and are composed of multiple layers of web 41 shown here.

An outer edge 22 forms the convex surface of expanded honeycomb sheet 410. An inner edge 21 forms the concave surface of expanded honeycomb sheet 140. Adhesive is applied to web 41 in a repeating pattern. There are three regions of web 41 which are defined by the pattern of adhesive. Areas of web 41 which are coated with adhesive comprise multiple equivalent units of a region 32 which serve to bond web 41 to overlying equivalent web 41 (FIG. 1). Adjacent to region 32 are a pair of equivalent regions 33 which are not coated with adhesive and which do not adhere to an overlying or underlying web 41. Regions 32 are adjacent to a respective equivalent region 31 which adheres to region 32 of underlying web 41. The pattern of adhesive is a repeating one such organization of regions for web 41 can be described as a unit pattern, $[33, 32, 33, 31]_x$, where x is equal to the number of times the pattern is repeated along web 41.

A plurality of webs 41 are stacked upon one another such that the adhesive pattern is staggered relative to each web 41. Each of the multiple regions 31 of overlying web 41 is always adherent to one of multiple regions 32 of underlying web 41. Conversely, each of the multiple regions 32 of underlying web 41 is always adherent to one of multiple regions 31 of overlying web 41.

When multiple layers of core ribbon are coated with adhesive and stacked in the described manner, there results a structure which can be expanded such that a continuous repeating pattern of six-sided cells is formed. Apposed regions 31 and 32 of adjoining webs 41 comprise the nodes or horizontal surfaces of repeating hexagonal cells which form the unit structure of honeycomb. Regions 33 form the rising and falling sides of repeating hexagonal cells.

The unit of adhesive pattern is a truncated triangle which defines region 32. The dimensions of region 32 and the distance between repeating regions 32 in web 41 are determined by the desired shape and dimensions of the final expanded honeycomb structure.

Additional parameters are evident upon the application of adhesive. The distance between any region 32 and the nearest region 31 at outer edge 22 is denoted $x_o$, which is the length of the outer edge of region 33. The distance between any region 32 and the nearest region 31 at inner edge 21 is denoted $x_i$, which is the length of the inner edge of region 33. The width of any region 32 at the outer edge is denoted $c_o$. The width of any region 32 at the inner edge is equal to $c_o$ plus the value $c_i$. These parameters are related by the equation $x_o + c_o = x_i + c_o + c_i$.

Figure 4:
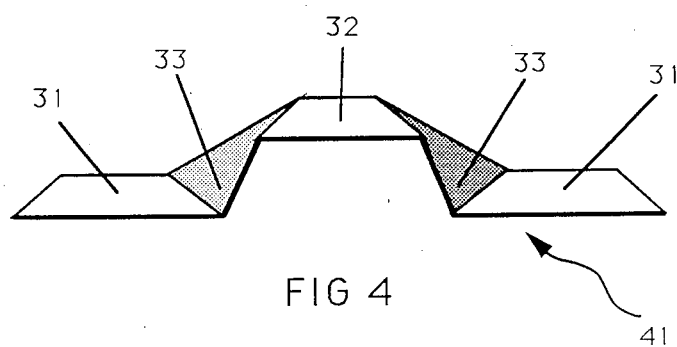
FIG. 4 is a fragmentary perspective view of a web of core material after adhesion and expansion into a structure whose outer waveform has an amplitude greater than, and a wavelength equal to, respectively, the amplitude and wavelength of the inner waveform.

FIG. 4 shows a fragmentary perspective view of a portion of web 41 after adhesion and expansion, and viewing from the inner edge. Region 32 has adhesive applied to it which serves to adhere 32 to region 31 of overlying web 41 (not shown). Regions 33 are not adherent to any other web 41, and comprise the rising and falling portions of half of a six-sided cell. Regions 31 are adherent to regions 32 of underlying web 41 (not shown). It can be seen that two waveforms result from the expansion, one comprising outer edge 22, and the other comprising inner edge 32.

Referring again to FIG. 3, additional insight into the present invention may be obtained. It can be seen that unexpanded web 41 is linear and thus it follows that, for the repeating unit of structure, inner edge 21 is equal in length to outer edge 22, i.e., $L_o = L_i$. However, it is apparent that $x_o$ is greater than $x_i$, and when web 41 is expanded, this difference constrains outer edge 22 to assume a waveform which has either a greater amplitude, greater wavelength, or both, relative to the waveform assumed by inner edge 21. As shown in FIGS. 5 through 9, when honeycomb sheet 410 is expanded such that the wavelengths of inner and outer edge waveforms are equal, the amplitude of the outer edge waveform must be greater than the amplitude of the inner waveform, and the result of assembling a sufficient number of multiple units of web 41 in the manner described is a straight cylinder with web 41 oriented parallel to the long axis of the cylinder.

When honeycomb sheet 410 is expanded such that the amplitudes of the inner and outer edge waveforms are equal, the wavelength of the outer edge waveform must be greater than the wavelength of the inner waveform, and the result of assembling multiple units of web 41 in the manner described, as shown in FIGS. 9 through 12, is a straight cylinder with web 41 oriented circumferentially about the cylinder.

Figure 5:
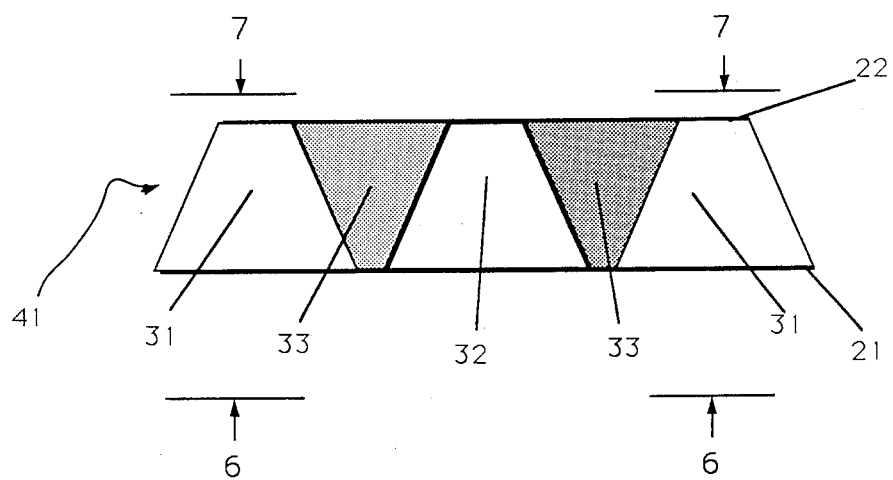
FIG. 5 is a fragmentary top plan view of the expanded web of FIG. 4.

FIG. 5 shows a fragmentary top plan view of web 41 after expansion of honeycomb sheet 410. Region 32 has had adhesive applied to it which serves to adhere 32 to region 31 of overlying web 41 (not shown). Regions 33 adjacent to 32 are not adherent to any other web 41, and comprise the rising and falling portions of a six-sided cell. Regions 31 are adherent to regions 32 of underlying web 41 (not shown). Inner edge 21 is parallel to outer edge 22.

Figure 6:
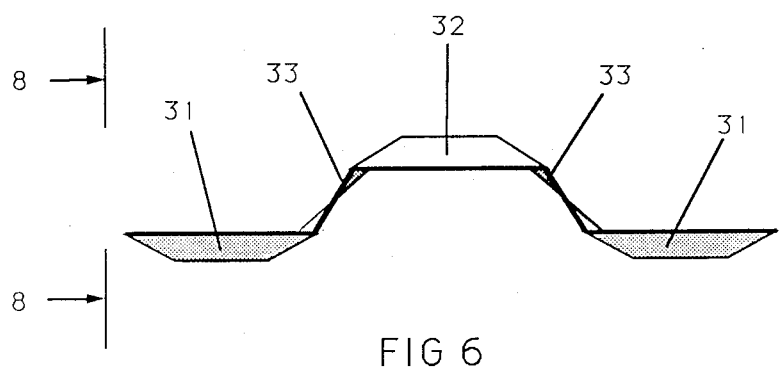
FIG. 6 is a fragmentary top plan view taken in the direction of the arrow 6—3 of FIG. 5.
Figure 7:
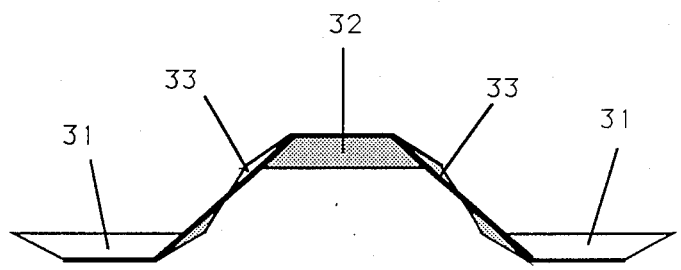
FIG. 7 is a fragmentary side plan view taken in the direction of the arrow 7—7 of FIG. 5.

FIGS. 6 and 7 are drawn to the same scale. FIG. 6 is taken in the direction of the arrow 6—6 of FIG. 5 and shows inner edge 21 and the waveform that is assumed by inner edge 21. FIG. 7 is taken in the direction of the arrow 7—7 of FIG. 5 and shows outer edge 22 and the waveform that is assumed by outer edge 22. When comparison is made to FIG. 6 it is readily apparent that the wavelength assumed by outer edge 22 is equal to the wavelength of inner edge 21, but the amplitude of the waveform assumed by outer edge 22 is larger than the amplitude of the waveform assumed by inner edge 21.

Figure 8:
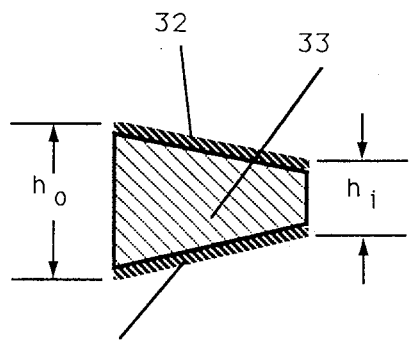
FIG. 8 is a fragmentary cross section view taken in the direction of the arrow 8—8 of FIG. 6.

FIG. 8 is taken in the direction of the arrow 8—8 of FIG. 6. It is apparent that the greater amplitude of the waveform assumed by outer edge 22 results in an outer cell height, $h_o$, which is greater than the inner cell height, $h_i$. If a sufficient number of webs 41 are adhered and expanded as described, a straight cylinder will be formed with an outer radius equal to $(w = h_o)/(h_o - h_i)$, where w is the width of web 41 as shown in FIG. 3.

Referring again to FIG. 3, it can be seen that as $c_i$ approaches zero, and if honeycomb sheet 410 is expanded such that the wavelengths of the inner and outer waveforms are held equal, the allowable ratio of outer to inner waveform amplitudes approaches unity, which would result in a straight cylinder with an infinitely large radius, or a planar sheet. Conversely, as $c_i$ approaches infinity, and if honeycomb sheet 410 is expanded such that inner and outer wavelengths are held equal, the allowable ratio of outer to inner waveform amplitudes becomes infinitely large, which would result in a straight cylinder with an inner radius approaching zero, and an outer radius approaching the width, w, of web 41.

Figure 9:
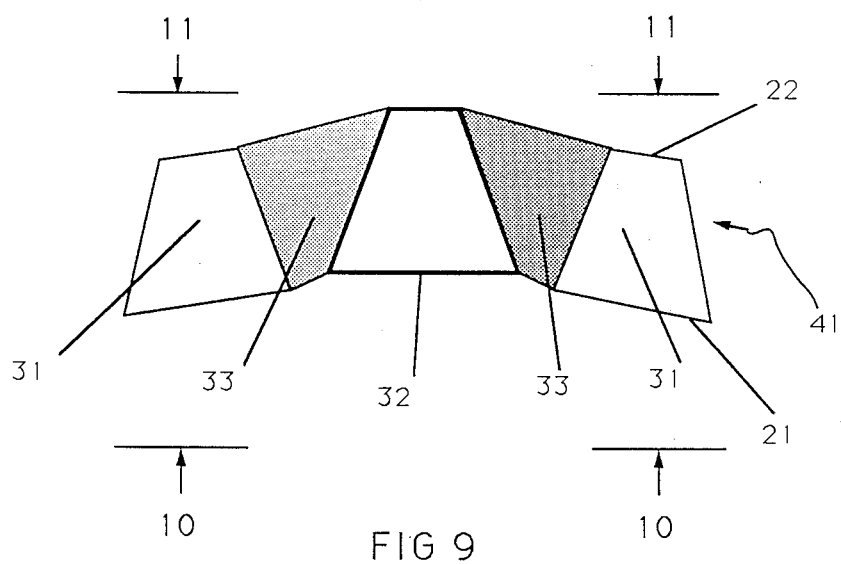
FIG. 9 is a fragmentary top plan view of a ribbon of core material after adhesion and expansion into a structure whose outer waveform has an amplitude that is equal to, and a wavelength greater than, respectively, the amplitude and wavelength of the inner waveform.

Referring now to FIGS. 9 through 12, the parameters of a straight cylinder with web 41 oriented circumferentially are described. FIG. 9 is a fragmentary top plan view of web 41 after expansion of honeycomb sheet 410. As in FIG. 5, region 32 has adhesive which joins region 32 to region 31 of overlying web 41 (not shown). Regions 31 of web 41 shown here are joined to regions 32 of underlying web 41 (not shown). Regions 33 are not adherent to any underlying or overlying web 41 and form the rising and falling sections of the six-sided cell that is formed after expansion of honeycomb sheet 410. Honeycomb sheet 410 has been expanded such that the amplitudes of the inner and outer edge waveforms of web 41 are equal, which is visible in FIGS. 10 and 11. The wavelength of outer edge 22 waveform is greater than the wavelength of inner edge 21 waveform, and this results in a curvature of web 41 after expansion of honeycomb sheet 410.

Figure 10:
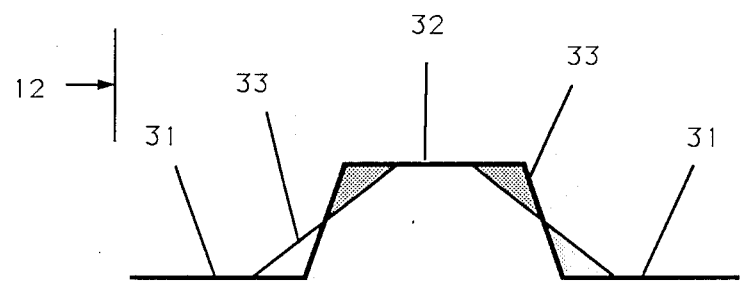
FIG. 10 is a fragmentary side plan view taken in the direction of the arrow 10—10 of FIG. 9.
Figure 11:
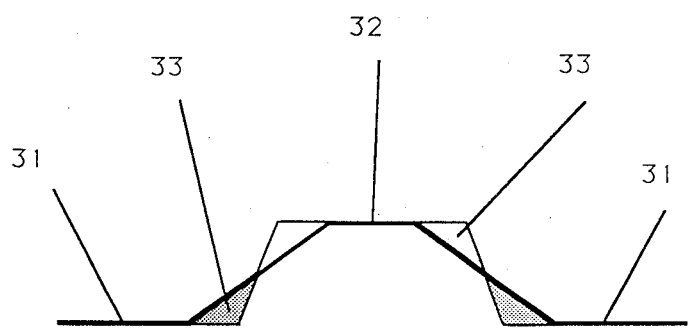
FIG. 11 is a fragmentary side plan view taken in the direction of the arrow 11—11 of FIG. 9.

FIGS. 10 and 11 are drawn to the same scale. FIG. 10 is taken in the direction of the arrow 10—10 of FIG. 9 and shows a fragmentary side plan view as seen from the inner edge. FIG. 11 is taken in the direction of the arrow 11—11 of FIG. 9 and shows a fragmentary side plan view as seen from the outer edge. A comparison of FIGS. 10 and 11 reveals that the amplitudes of both inner and outer edge waveforms are identical, but the wavelength of the outer edge waveform is greater than the inner edge waveform.

Figure 12:
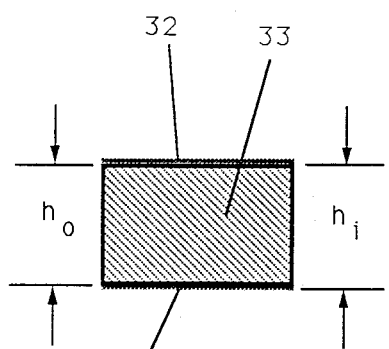
FIG. 12 is a fragmentary cross section view taken in the direction of the arrow 12—12 of FIG. 10.

FIG 12 is taken in the direction of the arrow 12—12 of FIG. 10, and shows a fragmentary cross-section view of web 41 after expansion of honeycomb sheet 410. It can be seen that outer cell height $h_o$ is equal to the inner cell height $h_i$. If the pattern of adhesive is repeated a sufficient number of times along web 41, stack 410 may be expanded to form a straight cylinder with web 41 oriented circumferentially.

Referring again to FIG. 3, the constraints on the dimensions of a cylinder with web 41 oriented circumferentially to the long axis of the cylinder can be examined. If $c_i$ is held constant, and if honeycomb sheet 410 is expanded such that the inner and outer waveform amplitudes are equal, it can be seen that as $c_o$ approaches zero, the ratio of outer waveform wavelength to inner waveform wavelength increases, resulting in a decrease in the radius of the cylinder. Conversely, if $c_o$ is held constant, and if honeycomb sheet 410 is expanded such that the inner and outer waveform amplitudes are equal, it can be seen that as $c_i$ approaches zero, the ratio of outer waveform wavelength to inner waveform wavelength approaches unity, the radius of the cylinder approaches infinity and a planar honeycomb panel results.

With the previous descriptions of straight cylinders with web 41 oriented in two possible directions, other more complex structures should become apparent from the present invention. It has been shown that the allowable limits of both amplitude and wavelength of the inner and outer edge waveforms follow from the dimensions of the adhesive pattern. If honeycomb sheet 410 is expanded such the amplitudes of inner and outer waveforms are held equal, the wavelength of the outer edge waveform must be greater than the wavelength of the inner edge waveform, producing a structure with a curvature about an axis normal to the plane of web 41. If honeycomb sheet 410 is expanded such that the wavelengths of inner and outer waveforms are equal, the amplitude of the outer edge waveform must be greater than the amplitude of the inner edge waveform, with a resultant compression of the inner cell height relative to outer cell height. If multiple units of web 41 are adhered and expanded in this way, stack 410 will form a cylinder with a curvature about an axis parallel to the plane of web 41. If honeycomb sheet 410 is expanded such that the wavelength of the outer edge waveform is greater than the wavelength of the inner edge waveform, but the amplitude of the outer edge waveform is greater than the amplitude of the inner edge waveform, a structure results with curvature about two orthogonal axes, one of which is parallel to the plane of web 41, and the other which is normal to the plane of web 41.

It follows that honeycomb structures constructed in accord with the present invention can have curvature in one or two dimensions, and can thus assume a multiplicity of shapes.

CONCLUSION, RAMIFICATIONS, AND SCOPE OF INVENTION

Thus the reader will see that the invention allows the construction of a variety of different shapes and sizes of honeycomb product.

While the above description contains many specificities, these should not be construed as limitations on the scope of the invention, but rather as an exemplification of several embodiments thereof. The structures shown in FIGS. 2A, 2B, and 2C are merely the most simple and readily explained example of the present invention. As the invention provides for the means of introducing curvatures in two dimensions and allows for a wide range of radii of curvature and cell size, many possible structures can be envisioned. Furthermore, as the method relies on the simple process of printing adhesive onto a web of core material, it is possible to vary the parameters of the adhesive pattern both within and between webs 41, thus allowing the construction of honeycomb structures which have curvatures whose radii vary within the structure. Within a broad range, it is theoretically possible to produce any structure that derives from a two-dimensional shell which is of uniform thickness.

Accordingly, the scope of the invention should be determined not by the embodiments illustrated, but by the appended claims and their legal equivalents.

What is claimed is the following:

1. A honeycomb product comprising a plurality of webs of core material upon which is printed an adhesive pattern comprising a multiplicity of regularly spaced truncated triangles, said webs forming a stack such that said adhesive pattern is staggered relative to said webs such that when said stack is expanded over a mold, said stack deforms into a non-planar sheet of honeycomb material with curvature about one or two orthogonal axes within the plane of said honeycomb sheet due to a conformation of cells which is compatible with the shape of said mold, the conformation of cells deriving from an inner and outer waveform wavelength and amplitude determined by the shape and size of said adhesive pattern.

2. A honeycomb product according to claim 1, including an outer skin bonded to the outer surface of said honeycomb product.

3. A honeycomb product according to claim 1, including an inner skin bonded to the inner surface of said honeycomb product.

4. A honeycomb product according to claim 2, including an inner skin bonded to the inner surface of said honeycomb product.

* * * * *